United States Patent
Kretz et al.

(10) Patent No.: US 8,655,882 B2
(45) Date of Patent: Feb. 18, 2014

(54) METHOD AND SYSTEM FOR ONTOLOGY CANDIDATE SELECTION, COMPARISON, AND ALIGNMENT

(75) Inventors: Donald R. Kretz, Plano, TX (US);
William D. Phillips, Tampa, FL (US);
Bruce E. Peoples, State College, PA (US); Justin W. Toennies, Largo, FL (US)

(73) Assignee: Raytheon Company, Waltham, MA (US)

( * ) Notice: Subject to any disclaimer, the term of this patent is extended or adjusted under 35 U.S.C. 154(b) by 145 days.

(21) Appl. No.: 13/221,974

(22) Filed: Aug. 31, 2011

(65) Prior Publication Data

US 2013/0054621 A1    Feb. 28, 2013

(51) Int. Cl.
*G06F 7/00* (2006.01)
*G06F 17/30* (2006.01)

(52) U.S. Cl.
USPC ........................................ 707/737; 707/739

(58) Field of Classification Search
USPC ................................................ 707/737, 739
See application file for complete search history.

(56) References Cited

U.S. PATENT DOCUMENTS

| | | | |
|---|---|---|---|
| 7,424,492 B2 | 9/2008 | Lau et al. | |
| 7,987,088 B2 * | 7/2011 | Moitra et al. | 704/10 |
| 2008/0082574 A1 * | 4/2008 | Hosokawa | 707/103 R |
| 2008/0270384 A1 | 10/2008 | Tak | |
| 2010/0023300 A1 | 1/2010 | Farry et al. | |
| 2010/0281061 A1 | 11/2010 | Chen | |
| 2011/0078205 A1 * | 3/2011 | Salkeld et al. | 707/794 |

OTHER PUBLICATIONS

Cruz I., et al., Using the AgreementMaker to Align Ontologies for OAEI 2010, ADVIS Lab, Department of Computer Science, University of Illinois at Chicago, USA, 2010, pp. 1-8. http://people.csail.mit.edu/pcm/templSWC/workshops/OM2010/oaei10_paper1.pdf (last visited, Aug 23, 2011).

* cited by examiner

*Primary Examiner* — Mariela Reyes
(74) *Attorney, Agent, or Firm* — Daly, Crowley, Mofford & Durkee, LLP

(57) ABSTRACT

A system for ontology candidate selection and comparison including a microprocessor and an ontology candidate selection component executing on the microprocessor and configured to compare at least a portion of a plurality of ontology candidates based on a candidate selection rule, and based on said comparison, select from the plurality of ontology candidates a pair of ontologies. The system further includes an ontology similarity component coupled to the ontology candidate selection component and configured to generate a similarity outcome related to the pair of ontologies based on a similarity rule and evaluate at least one of: the candidate selection rule or the similarity rule based on the similarity outcome.

33 Claims, 7 Drawing Sheets

METHOD AND SYSTEM FOR ONTOLOGY CANDIDATE SELECTION, COMPARISON, AND ALIGNMENT

FIELD OF THE INVENTION

The inventive subject matter relates to ontology candidate selection, comparison, and alignment, more particularly, to selecting candidate ontologies based on candidate selection rules, comparing ontologies based on similarity rules, and generating ontology alignments based on similarity outcomes.

BACKGROUND

Business, political, and military strategists can benefit by understanding the social-cultural factors that define and influence a geographic region in which important operations occur. Although strategists may have access to vast quantities of social-cultural information, unfamiliarity with the local customs, behaviors, and beliefs can make it rather challenging and time-consuming for strategists to interpret the information. Moreover, strategists and analysts often face inherent complexities and disparities within the information, especially in merging information from different sources where the same concepts or events may be reported using different and contextually dependent terminology.

Concerning the military, social-cultural challenges and irregular warfare have changed the key aspects of how military forces execute wars. It may no longer be sufficient for military forces to execute a kinetic war with precision weapons and persistent surveillance. Military forces must also understand and win over the local population within areas of operations. In particular, military forces and strategists must understand the social-cultural dispositions of local populations to try and improve relations and gain support and influence among the people. As an example, military forces must understand the local hierarchy, family structure, tribal structure, and business relationships of a village in order to effectively exercise local influence.

Strategists face the uncertainty of how best to characterize social-cultural information because of their unfamiliarity and incomplete understanding of social-cultural factors that influence and define a region. Moreover, when information is available, it is often dispersed among multiple data stores which may be organized in a number of different ways (such as one or more ontologies described below). In order to form useful composite pictures, strategists and analysts commonly resort to labor intensive and time-consuming review and manual fusion of the data. However, this can hinder an information consumer's strategic need and/or preference for real-time (or as close as possible to real-time) situational awareness, especially in dynamically evolving environments.

An ontology is a structured representation of knowledge as a set of concepts and relationships between the concepts. Ontologies are used to describe, analyze, and gain an understanding of knowledge, typically within a domain. As by way of a non-limiting example, a domain can include a social-cultural domain used to describe local populations within a geographic area (or even different local populations, cultures, and beliefs within a larger geographic context, operational theatre, or country). There can be multiple ontologies which describe a domain generated by disparate sources and organizations. Ontologies can be aligned to attempt to synthesize and merge ontological data from these multiple data sources. However, the process is often defined by labor-intensive, time-consuming brute-force methods and in some cases, may even be wrought by trial and error, making it difficult for strategists and analysts (and other information consumers) to form a reliable composite picture.

SUMMARY

In general overview, the systems, techniques, and concepts described herein are directed to ontology candidate selection, comparison, and alignment. More particularly, to selecting ontologies based on candidate selection rules, comparing ontologies based on similarity rules, and generating alignments based on similarity outcomes. Evaluation of candidate selection rules, similarity rules, and similarity outcomes can greatly facilitate an understanding of domain concepts and relationships. Advantageously, the systems and techniques enable ontology candidate pairings to be aligned and/or matched with each other more effectively, as well as review of certain matching techniques to generate useful, desirable, and reliable ontology alignments.

In some embodiments, an adaptable heuristic agent is used to review and evaluate ontology candidates and select certain candidates for further comparison and possible alignment. Advantageously, the heuristic agent can be guided by knowledge of which candidate selection rules and/or ontology matching techniques tend to generate desirable and effective outcomes. In some embodiments, ontology candidate selection rules can include ontology criteria including, but not limited to, observational criteria, domain relevance criteria, and ontology processing time criteria. Such criteria may be compared for candidate combinations to select certain combinations for further review and inspection.

Moreover, the heuristic agent is used to apply ontology similarity and matching techniques to selected ontology candidates. In one non-limiting example, a group of similarity rules such as text-based associations between ontology concepts, semantic-based associations between ontology concepts, and/or statistical significance correlations can be used to generate similarity outcomes. Thresholds related to concept associations may be generated and applied to determine which concept associations to use to generate similarity outcomes, and which to discard.

The number of associations meeting certain confidence level thresholds can be calculated for ontology pairings such that the ontology pairings can be ranked and evaluated. More particularly, candidate selection rules and similarity rules can be evaluated to determine which rules and associations tend to yield the most effective ontology alignments. Advantageously, the systems and techniques described herein can enable a more reliable and effective formation of composite pictures of domain data and data constructs (such as an ontology), which may include those from multiple data sources.

In one aspect, a system for ontology candidate selection and comparison includes a microprocessor, an ontology candidate selection component executing on the microprocessor, and an ontology similarity component coupled to the ontology candidate selection. The ontology candidate selection component is configured to compare at least a portion of a plurality of ontology candidates based on a candidate selection rule and, based on said comparison, select from the plurality of ontology candidates a pair of ontologies. The ontology similarity component is configured to generate a similarity outcome related to the pair of ontologies based on a similarity rule and evaluate at least one of: the candidate selection rule or the similarity rule based on the similarity outcome.

In further embodiments, the system includes one or more of the following features: the ontology candidate selection component is further configured to generate a set of ontology combinations from the plurality of ontologies, each ontology combination including a first ontology candidate and second ontology candidate, compare the first ontology candidate and the second ontology candidate in each ontology combination based on the candidate selection rule, generate a plurality of sorted comparisons of the ontology combinations and, select the pair of ontologies according to the sorted comparisons; the candidate selection rule is associated with at least one of ontology observational criteria, ontology structural criteria, ontology functional criteria, ontology processing time criteria, or ontology usability criteria; the ontology candidate selection component is further configured to select the pair of ontologies based on a comparison of at least one of an ontology observational criterion of the first ontology and an ontology observational criterion of the second ontology or an ontology functional criterion of the first ontology and an ontology functional criterion of the second ontology; the pair of ontologies includes a first ontology and a second ontology and the similarity rule is based on a confidence level associated with a text-based association including a first concept string from the first ontology and a second concept string from the second ontology; the similarity rule is further based on a threshold confidence level and the similarity outcome is based on at least one text-based association associated with a confidence level greater than or equal to the threshold confidence level; the ontology similarity component is further configured to generate the threshold confidence level based on an F-score associated with the at least one text-based association; the pair of ontologies includes a first ontology and a second ontology and the similarity rule is based on a confidence level associated with a semantic-based association including a first concept from the first ontology and a second concept string from the second ontology; the similarity rule is further based on a threshold confidence level and the similarity outcome includes at least one semantic-based association associated with a confidence level greater than or equal to the threshold confidence level; the ontology similarity component is further configured to generate the threshold confidence level based on an F-score and a significant difference calculation associated with the at least one semantic-based association; the pair of ontologies includes a first ontology and a second ontology and the similarity rule is based on a plurality of text-based confidence levels associated with a plurality of text-based associations, each text-based association including concept strings from the first ontology and the second ontology and, a plurality of semantic confidence levels associated with a plurality of semantic-based associations, each semantic-based association including concept strings from the first ontology and the second ontology; the similarity rule is further based on a text-based threshold confidence level and a semantic-based threshold confidence level and the similarity outcome is based on at least one semantic-based association associated with a semantic-based confidence level greater than or equal to the semantic-based threshold confidence level and at least one text-based association associated with a text-based confidence level greater than or equal to the text-based threshold confidence level; the similarity outcome is further based on a similarity outcome score of a number of text-based associations greater than or equal to the text-based threshold confidence level and a number of semantic-based associations greater than or equal to the semantic-based threshold confidence level; the ontology similarity component is further configured to evaluate at least one of the candidate selection rule or the similarity rule, said evaluation based on a plurality of sorted similarity outcome scores associated with a plurality of pairings of ontologies; the ontology similarity component is further configured to evaluate at least one of the candidate selection rule or the similarity rule, said evaluation based on a plurality of sorted similarity outcomes associated with a plurality of pairings of ontologies; an ontology alignment component coupled to the ontology similarity component and configured to generate an alignment mapping between similar concepts in the pair of ontologies based on the similarity outcome, and; the ontology alignment component further generates a new or modified ontology, schema, or relationship list based on the alignment mapping.

In another aspect, a system for ontology candidate selection and comparison includes a microprocessor, a candidate evaluation agent executing on the microprocessor and configured to receive ontology data associated with a plurality of ontology candidates, compare at least one combination of the ontology candidates based on a candidate selection rule to generate a comparison outcome, and select a pair of ontologies based on the comparison outcome, a similarity agent configured to generate a similarity outcome based on a similarity rule applied to the selected pair of ontologies, and a heuristic agent coupled to the candidate evaluation agent and the similarity agent and configured to select the candidate selection rule from a plurality of candidate selection rules, select the similarity rule from a plurality of ontology similarity rules, and evaluate at least one of: the candidate selection rule or the similarity rule based on the similarity outcome.

In further embodiments, the system includes one or more of the following features: the at least one ontology candidate combination includes a plurality of ontology candidate combinations, each ontology candidate combination including a first ontology candidate and second ontology candidate, the candidate evaluation agent further configured to, compare the first ontology candidate and the second ontology candidate in each ontology combination based on the candidate selection rule to generate a plurality of sorted comparison outcomes, and select the pair of ontologies according to the sorted comparison outcomes; the candidate selection rule is associated with at least one of ontology observational criteria, ontology structural criteria, ontology functional criteria, ontology processing time criteria, or ontology usability criteria; the pair of ontologies includes a first ontology and a second ontology and the comparison outcome includes at least one of an ontology observational criterion of the first ontology and an ontology observational criterion of the second ontology or an ontology functional criterion of the first ontology and an ontology functional criterion of the second ontology; the pair of ontologies includes a first ontology and a second ontology and the similarity rule is based on a confidence level associated with a text-based association including a first concept string from the first ontology and a second concept string from the second ontology; the similarity rule is further based on a threshold confidence level and the similarity outcome is based on at least one text-based association associated with a confidence level greater than or equal to the threshold confidence level; the similarity agent is further configured to generate the threshold confidence level based on an F-score associated with the at least one text-based association; the pair of ontologies includes a first ontology and a second ontology and the similarity rule is based on a confidence level associated with a semantic-based association including a first concept from the first ontology and a second concept string from the second ontology; the similarity rule is further based on a threshold confidence level and the similarity outcome includes at least one semantic-based association associated with a confidence level greater than or equal to the threshold confidence level; the similarity agent is further configured to generate the threshold confidence level based on an F-score and a significant difference calculation associated with the at least one semantic-based association; the pair of ontologies includes a first ontology and a second ontology and the similarity rule is based on a plurality of text-based confidence levels associated with a plurality of text-based associations, each text-based association including concept strings from the first ontology and the second ontology, and a plurality of semantic confidence levels associated with a plurality of semantic-based associations, each semantic-based association including concept strings from the first ontology and the second ontology; the similarity rule is further based on a text-based threshold confidence level and a semantic-based threshold confidence level and the similarity outcome is based on at least one semantic-based association associated with a semantic-based confidence level greater than or equal to the semantic-based threshold confidence level, and at least one text-based association associated with a text-based confidence level greater than or equal to the text-based threshold confidence level; the similarity outcome is further based on a similarity outcome score of a number of text-based associations greater than or equal to the text-based threshold confidence level and a number of semantic-based associations greater than or equal to the semantic-based threshold confidence level; the heuristic agent is further configured to evaluate at least one of: the candidate selection rule or the similarity rule, said evaluation based on a plurality of sorted similarity outcome scores associated with a plurality of pairings of ontologies, and select at least one of: the candidate selection rule from a plurality of candidate selection rules or the similarity rule from a plurality of similarity rules based on said evaluation, and; the heuristic agent is further configured to evaluate at least one of the candidate selection rule or the similarity rule, said evaluation based on a plurality of sorted similarity outcomes associated with a plurality of pairings of ontologies, and select at least one of: the candidate selection rule from a plurality of candidate selection rules or the similarity rule from a plurality of similarity rules based on said evaluation.

In a further aspect, a method for ontology candidate selection and comparison includes in a microprocessor, generating a set of ontology combinations from a plurality of ontologies, each ontology combination including a first ontology candidate and second ontology candidate, comparing the first ontology candidate and the second ontology candidate in each ontology combination based on a candidate selection rule to generate a plurality of comparisons of the ontology combinations, based on said comparisons, selecting from the plurality of ontology candidates a pair of ontologies, generating a similarity outcome related to the pair of ontologies based on a similarity rule, and evaluating at least one of the candidate selection rule or the similarity rule based on the similarity outcome.

In further embodiments, the method includes one or more of the following features: selecting from the plurality of ontology candidates a pair of ontologies further includes sorting the plurality of comparisons, and selecting the pair of ontologies according to the sorted comparisons; the candidate selection rule is associated with at least one of ontology observational criteria, ontology structural criteria, ontology functional criteria, ontology processing time criteria, or ontology usability criteria; selecting from the plurality of ontology candidates a pair of ontologies further includes selecting the pair of ontologies based on a comparison of at least one of an ontology structural criterion of the first ontology and an ontology structural criterion of the second ontology or an ontology functional criterion of the first ontology and an ontology functional criterion of the second ontology; the pair of ontologies includes a first ontology and a second ontology and the similarity rule is based on a confidence level associated with a text-based association including a concept string from the first ontology and a concept string from the second ontology; the similarity rule is further based on a threshold confidence level and the similarity outcome is based on at least one text-based association associated with a confidence level greater than or equal to the threshold confidence level; generating a similarity outcome related to the pair of ontologies further includes generating the threshold confidence level based on an F-score associated with the at least one text-based association; the pair of ontologies includes a first ontology and a second ontology and the similarity rule is based on a confidence level associated with a semantic-based association including a concept from the first ontology and a concept from the second ontology; the similarity rule is further based on a threshold confidence level and the similarity outcome includes at least one semantic-based association associated with a confidence level greater than or equal to the threshold confidence level; generating a similarity outcome related to the pair of ontologies further includes generating the threshold confidence level based on an F-score and a significant difference calculation associated with the at least one semantic-based association; the pair of ontologies includes a first ontology and a second ontology and the similarity rule is based on a plurality of text-based confidence levels associated with a plurality of a text-based associations, each text-based association including concept strings from the first ontology and the second ontology, and a plurality of semantic confidence levels associated with a plurality of semantic-based associations, each semantic-based association including concept strings from the first ontology and the second ontology; the similarity rule is further based on a text-based threshold confidence level and a semantic-based threshold confidence level and the similarity outcome is based on at least one semantic-based association associated with a semantic-based confidence level greater than or equal to the semantic-based threshold confidence level, and at least one text-based association associated with a text-based confidence level greater than or equal to the text-based threshold confidence level; the similarity outcome is further based on a similarity outcome score of a number of text-based associations greater than or equal to the text-based threshold confidence level and a number of semantic-based associations greater than or equal to the semantic-based threshold confidence level; evaluating at least one of the candidate selection rule or the similarity rule is further based on a plurality of sorted similarity outcome scores associated with a plurality of ontology pairings; evaluating at least one of the candidate selection rule or the similarity rule is further based on a plurality of sorted similarity outcomes associated with a plurality of ontology pairings; generating an alignment mapping between similar concepts in the pair of ontologies based on the similarity outcome; generating an alignment mapping further includes generating a new or modified ontology, schema, or relationship list based on the alignment mapping.

BRIEF DESCRIPTION OF THE DRAWINGS

The foregoing features of the systems, techniques, and concepts described herein may be more fully understood from the following description of the drawings in which.

DETAILED DESCRIPTION

Figure 1:
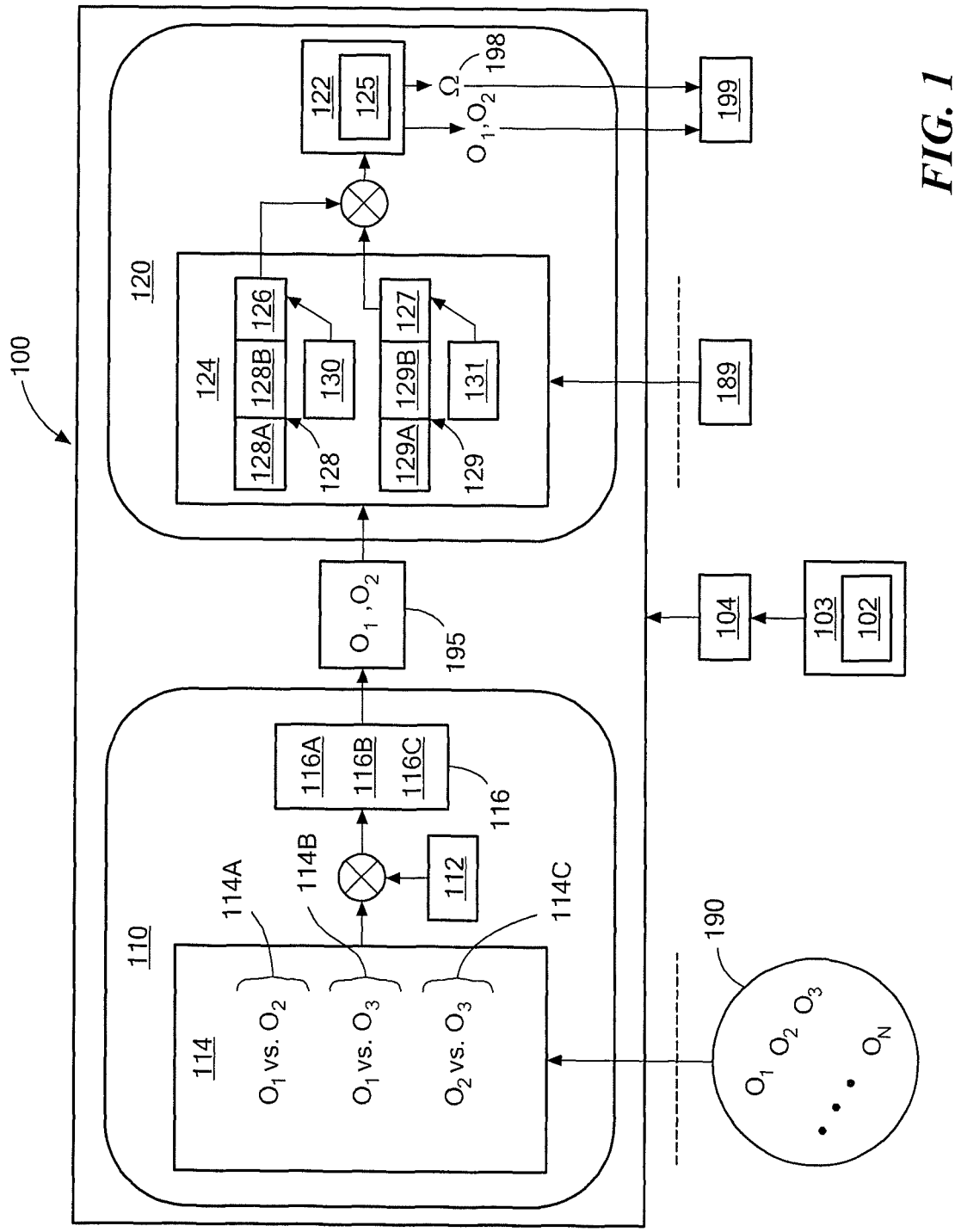
FIG. 1 is a block diagram of an embodiment of a system for ontology candidate selection and comparison.

Referring now to FIG. 1, system 100 for ontology candidate selection and comparison includes microprocessor 104, ontology candidate selection component 110 executing on microprocessor 104 and ontology similarity component 120 coupled to ontology candidate selection component 110. Ontology candidate selection component 110 compares ontology candidates 190 based on candidate selection rule 112 and, based on said comparison of ontology candidates 190, selects from ontology candidates 190 a pair of ontologies 195. Ontology similarity component 120 generates similarity outcome 122 related to pair of ontologies 195 based on similarity rule 124.

In some embodiments, system 100 includes instructions 102 stored in memory 103 that when loaded into and executed by processor 104, enable ontology candidate selection and comparison. System 100 may include software and/or hardware components to enable various features of ontology candidate selection and comparison.

In some embodiments, ontology candidate selection component 110 generates set of ontology combinations 114 including combinations of some or all of ontology candidates 190 (which are designated in FIG. 1 and in the corresponding text as $O_1$, $O_2$, $O_3$, up to $O_N$). Ontology combinations 114 include first ontology candidate (for example, $O_1$) and second ontology candidate (for example, $O_2$) which are compared based on candidate selection rule 112 to generate respective combination comparisons 116. As will be described in more detail below, ontology candidate selection component 110 selects pair of ontologies 195 (that is, one of the combinations 114) based on the comparisons 116.

In one particular embodiment illustrated in FIG. 1, ontology combinations 114 include combinations $O_1$ vs. $O_2$ (114A), $O_1$ vs. $O_3$ (114B) and $O_2$ vs. $O_3$ (114C), which include all possible combinations of ontology candidates $O_1$, $O_2$, and $O_3$. Ontology candidate selection component 110 compares each ontology combination 114A, 114B, 114C based on candidate selection rule 112 to generate respective comparisons 116A, 116B, 116C. In a further embodiment, comparisons 116A, 116B, 116C include values generated from candidate selection rule 112 and which may be sorted and/or ranked for selection purposes. Such values may include scores and, in further embodiments, averages representative of the ontology comparisons 116.

In a further embodiment, candidate selection rule 112 is associated with ontology observational criteria including, but not limited to, node depth, node breath, terminology overlap and/or semantic overlap, tangledness, fan-outness, density, modularity, logical adequacy, and/or degree distribution, as well as, domain relevance criteria, and ontology processing time criteria. Ontology comparisons 116 can be based on these observational criteria. For example, ontology comparisons 116 can include, but are not limited to, comparison of depth, breadth, terminological overlap, etc. of the ontology candidates 190.

In the same or different embodiment, candidate selection rule 112 is associated with ontology functional criteria including, but not limited to, conceptual thresholds, intended conceptualization, consistency, task assessment, topic assessment, and/or natural language processing evaluation. In the same or different embodiment, candidate selection rule 112 is associated with ontology usability criteria including, but not limited to, user recognition, user efficiency, and/or fitness for a user. In one particular embodiment, candidate selection rule 112 is based on ontology node depth for ontology combinations 114. In particular, a node depth comparison 116 is determined for each ontology combination 114. Ontology combinations 114 may be sorted (for example, in ascending or descending order) according to node depth comparisons 116. For example, if node depth of $O_1$ is 3, node depth of $O_2$ is 6 and node depth of $O_3$ is 5, then ontology comparisons 116 can be sorted in descending order as $O_1$ vs. $O_2$ (116A, node depth difference equals 3), $O_1$ vs. $O_3$ (116B, node depth difference equals 2), and $O_2$ vs. $O_3$ (116C, node depth difference equals 1). Here, ontology candidate selection component 110 can select pair of ontologies 195 corresponding to ontology combination $O_1$ vs. $O_2$ (114A) with the greatest node depth difference comparison (116A). In other words, pair of ontologies 195 corresponds to ontology candidates 190 with the minimum node depth and the maximum node depth.

Similarity rule 124 can be based on a variety of ontological criteria including, but not limited to, observational criteria, domain relevance criteria, and ontology processing time criteria. Observational criteria may include string-based criteria such as name similarity and/or description similarity of ontological concepts, linguistic criteria such as those associated with lexical networks, dictionaries, and/or thesauri, etc., and/or language-based criteria such as lemmatization and/or morphological features. Observational criteria can include, but are not limited to, constraint information such as type similarity and/or key properties, graph-based criteria such as path analysis and/or parent-child relationships, taxonomical features, ontology reuse including the entire ontology and/or segments thereof, and/or structure metadata and neighborhood information. Extensional criteria can include, but are not limited to, ontological features such as frequency distributions and/or probability estimates.

In some embodiments, pair of ontologies 195 includes first ontology (for example, $O_1$) and second ontology (for example, $O_2$) and similarity rule 124 is based on confidence level 126 associated with text-based associations (an example of which is designated by reference numeral 128) including first concept string 128A from first ontology $O_1$ and second concept string 128B from second ontology $O_2$. In general, confidence level 126 represents a level of concept string association (that is, the strength/weakness of concept string association). Such concept string associations can be text-based and/or semantic-based, although not limited to these types of associations and can include structural and/or extensional criteria.

In a further embodiment, similarity rule 124 is further based on threshold confidence level 130. Here, similarity outcome 122 is based on text-based associations 128 associated with a confidence level 126 greater than or equal to threshold confidence level 130, as will be described in more detail below.

With reference to TABLE 1 and again to FIG. 1, in one particular embodiment of ontology similarity component

120, text-based confidence levels (column 4, "Confidence Level") are associated with text-based associations (column 1, "Association"), each text-based association including a first concept string from a first ontology (column 2, "String 1") and a second concept string from a second ontology (column 3, "String 2"). TABLE 1 is an example that includes a total of 10,460 text-based associations sorted in descending order of confidence level, although some rows are omitted for ease in the illustration only. For example, text-based association #1 (that is, the text-based association shown in the first row of TABLE1) includes concept string "Car" from a first ontology (for example, $O_1$) and concept string "Car" from a second ontology (for example, $O_2$).

In this particular embodiment, confidence level can range from a value of 1.0 to 0.0, wherein a value of 1.0 is indicative of a strong association (which can include an exact match between the strings) and a value of 0.0 is indicative of minimal or no association. Here, text-based association #1 is associated with a confidence level of 1.0 because concept strings are the same, whereas text-based association #203 has a confidence level of 0.688 because one concept string is plural and the other singular.

TABLE 1

| Association | String 1 | String 2 | Confidence Level |
|---|---|---|---|
| 1 | Car | Car | 1.000 |
| . | . | . | . |
| . | . | . | . |
| . | . | . | . |
| 99 | independence | independence | 1.000 |
| 100 | bay | bay | 1.000 |
| 101 | classes | class | .997 |
| 102 | religion | religious | .995 |
| . | . | . | . |
| . | . | . | . |
| . | . | . | . |
| 203 | Maps | Map | .688 |
| 204 | Military organizations | militant | .623 |
| . | . | . | . |
| . | . | . | . |
| . | . | . | . |
| 10,460 | Military organizations | mention | 0.0 |

In a further embodiment, ontology similarity component 120 generates threshold confidence level 126 based on an F-score associated with text-based associations 128. The F-score is used in combination with statistical significance calculations to generate threshold confidence level 130 and establish those text-based associations 128 which should be used in generating similarity outcome 122 and those which should be discarded. Text-based associations 128 may be generated using an ontology comparison algorithm 189 which determines which concept strings within ontologies to associate. The algorithm 189 may use various methods, such as string character by string character matching, to associate concept strings.

An F-score is a measure of algorithmic fidelity and may be computed based on ontology comparison algorithm 189 precision and recall. Precision is a measure of exactness or fidelity, whereas recall is a measure of completeness. Precision and recall may be based on true positives (tp), true negatives (tn), false positives (fp), and false negatives (fn) of the concept string associations. Precision may be based on the following equation:

$$\text{precision}=tp/(tp+fp)$$

Recall may be based on the following equation:

$$\text{recall}=tp/(tp+fn)$$

In this embodiment, the closer the F-score is to 1.0, the higher the degrees of both precision and recall. The following equation may be used to compute F-score:

$$F\text{-score}=2*(\text{precision}*\text{recall})/(\text{precision}+\text{recall}).$$

Statistical Significance of text-based association 128 is indicative of whether results between two text-based associations are unlikely to have occurred by chance and may be referred to as the critical p-value.

In some embodiments, ontology similarity component 120 uses sets of text-based associations 128 to determine threshold confidence level 130. A first set (hereinafter, referred to as "Set 1") is defined to include all text-based associations having a confidence level equal 1.0. In TABLE 1, 100 text-based associations have a confidence level value equal to 1.0. The F-score is computed for Set 1. Since this set includes exact concept string matches, the F-score will be 1.0.

As seen in TABLE 1, text-based association #101 is associated with the first confidence level below 1.000. The confidence level for observation #101 is 0.997. A second set (hereinafter, referred to as "Set 2") is defined including all of Set 1's text-based associations and text-based association #101 for a sample size of 101 text-based associations. An F-score of 0.997 is determined for Set 2.

A statistical significance calculation uses Set 1's F-score and Set 2's F-score (which may respectively be expressed as percentages 100.0 and 99.7) and Set 1's sample size (100) and Set 2's sample size (101) as inputs. There are many known methods for calculating statistical significance using percentages and sample size as inputs. Here, no statistical significance is found between Set 1 and Set 2.

Set 2 is replaced using the next text-based association #102 and all of the previous text-based associations. An F-score of 0.992 is determined for Set 2 and the statistical significance calculation uses Set 1's F-score and Set 2's updated F-score (which may respectively be expressed as percentages 100.0 and 99.2) and Set 1's sample size (100) and Set 2's updated sample size (102) as inputs. Again, no statistical significance is found between Set 1 and Set 2.

Statistical significance calculations are continued until a statistical significance is found using Set 1 and Set 2 information. In this example, when Set 2 is defined to include text-based observation #203 with a computed F-score of 0.542 and sample size of 203, a statistical significance is found and threshold confidence level 130 is set to 0.688 (that is, the confidence level of text-based association #203). In this example, ontology similarity component 120 will use threshold confidence level equal to 0.688 to determine which text-based associations to use to generate similarity outcome 122, and which to discard.

In some embodiments, pair of ontologies 195 includes first ontology (for example, $O_1$) and second ontology (for example, $O_2$) and similarity rule 124 is based on confidence level 127 associated with semantic-based associations (an example of which is designated by reference numeral 129) including first concept string 129A from first ontology $O_1$ and second concept string 129B from second ontology $O_2$. In a further embodiment, similarity rule 124 is further based on threshold confidence level 131. Here, similarity outcome 122 is based on semantic-based associations 129 associated with confidence levels 127 greater than or equal to threshold confidence level 131, as will be described in more detail below.

With reference to TABLE 2 and again to FIG. 1, in one particular embodiment of ontology similarity component 120, semantic-based confidence levels (column 4, "Confidence Level") are associated with semantic-based associations (column 1, "Association"), each semantic-based association including a first concept string from a first ontology (column 2, "String 1") and a second concept string from a second ontology (column 3, "String 2"). TABLE 2 includes a total of 490 semantic-based associations sorted in descending order of confidence level 127, although some rows are omitted for ease in the illustration only. For example, semantic-based association #99 (that is, the semantic-based association shown in the first row of TABLE 2) includes concept string "independence" from a first ontology (for example, $O_1$) and concept string "independence" from a second ontology (for example, $O_2$).

In this particular embodiment, confidence level 127 can range from a value of 1.0 to 0.0, wherein a value of 1.0 is indicative of a strong semantic association of the concept strings and a value of 0.0 is indicative of minimal or no association between concept strings. Here, semantic-based association #100, for example, is associated with a confidence level of 1.0 because string "teacher" and string "instructor" are semantically the same, whereas semantic-based association #490 has a confidence level of 0.763 because of the semantic differences between string "village" and string "community."

TABLE 2

| Association | String 1 | String 2 | Confidence Level |
|---|---|---|---|
| 99 | independence | independence | 1.000 |
| 100 | teacher | instructor | 1.000 |
| 101 | teacher | mentor | .997 |
| 102 | religion | creed | .995 |
| . | . | . | . |
| . | . | . | . |
| . | . | . | . |
| 490 | village | community | .763 |

In a further embodiment, ontology similarity component 120 generates threshold confidence level 131 based on F-scores associated with semantic-based associations 129. F-scores are used in combination with statistical significance calculations to generate threshold confidence level 131 and establish those semantic-based associations 129 which should be used in generating similarity outcome 122 and those which should be discarded. Semantic-based associations 129 may be determined using an ontology comparison algorithm (as may be the same or similar to ontology comparison algorithm 189) which determines which concept strings to associate. The algorithm 189 may use various methods, such as semantic matching, to associate concept strings.

In some embodiments, ontology similarity component 120 uses sets of semantic-based associations 129 to determine threshold confidence level 131. A first set (hereinafter, referred to as "Set A") is defined to include all semantic-based associations having a confidence level equal 1.0. In TABLE 2, 100 semantic-based associations have a confidence level value equal to 1.0. An F-score equal to 1.0 is computed for Set A.

As seen in TABLE 2, semantic-based association #101 is associated with the first confidence level 127 below 1.000. The confidence level for observation #101 is 0.997. A second set (hereinafter, referred to as "Set B") is defined including all of Set A's semantic-based associations and semantic-based association #101 for a sample size of 101 semantic-based associations. An F-score of 0.995 is determined for Set B.

A statistical significance calculation uses Set A's F-score and Set B's F-score (which may respectively be expressed as percentages 100.0 and 99.5) and Set A's sample size (100) and Set B's sample size (101) as inputs. Here, no statistical significance is found between Set A and Set B.

Set B is replaced using the next text-based association #102 and all of the previous semantic-based associations. An F-score of 0.989 is determined for Set B and the statistical significance calculation uses Set A's F-score and Set B's F-score (which may respectively be expressed as percentages 100.0 and 98.9) and Set A's sample size (100) and Set B's sample size (102) as inputs. Again, no statistical significance is found between Set A and Set B.

Statistical significance calculations are continued until a statistical significance is found using Set A and Set B information. In this example, when Set B is defined to include semantic-based observation #490 with a computed F-score of 0.542 and sample size of 490, a statistical significance is found and threshold confidence level 131 is set to 0.763 (that is, the confidence level of semantic-based observation #490). In this example, ontology similarity component 120 will use threshold confidence level equal to 0.763 to determine which semantic-based associations 129 to use to generate similarity outcome 122, and which to discard.

In a further embodiment, ontology similarity component 120 determines similarity outcome 122 based on text-based associations 128 and semantic-based associations 129. Similarity outcome 122 may be based on similarity outcome score 125 of a number of text-based associations 128 greater than or equal to text-based threshold confidence level 130 and a number of semantic-based associations 129 greater than or equal to semantic-based threshold confidence level 131.

TABLE 3 illustrates a particular example of similarity outcome scores for pairings of ontology candidates $O_1$, $O_2$, $O_3$, and $O_4$. For example, ontology pairing $O_1$ vs. $O_2$ (column 1, "Ontology pair") generated 203 text-based associations (column 2, "Text-based associations") and 490 semantic-based associations (column 3, "Semantic-based associations"). Similarity outcome score, $SO_{SCORE}$ (column 4, "Score"), may be determined using the following equation, which in this example is representative of an average of the number of text-based associations and the number of semantic-based associations for the ontology pair:

$$SO_{SCORE} = (\text{No. of text-based associations} + \text{No. of semantic-based associations})/2$$

TABLE 3

| Ontology pair | Text-based associations | Semantic-based associations | Score |
|---|---|---|---|
| $O_1$ vs. $O_2$ | 203 | 490 | 346.5 |
| $O_1$ vs. $O_3$ | 420 | 680 | 550 |
| $O_1$ vs. $O_4$ | 122 | 186 | 154 |
| $O_2$ vs. $O_3$ | 56 | 128 | 92 |
| $O_2$ vs. $O_4$ | 338 | 428 | 383 |
| $O_3$ vs. $O_4$ | 47 | 76 | 61.5 |

As can be seen in TABLE 3, ontology pairing $O_1$ vs. $O_3$ resulted in the highest similarity outcome score.

In some embodiments, ontology similarity component 120 evaluates candidate selection rule 112 and/or similarity rule 124 based on similarity outcome 122. In yet another embodiment, the evaluation is based on a group of sorted similarity outcomes, which may include sorted similarity outcome scores (such as those exemplified in TABLE 3) for ontology pairings 195.

Moreover, based on these evaluations, system 100 can determine which candidate selection rules 112 and/or similarity rules 124 tend to generate the most desirable and effective ontology pairings 195 and select those rules to further feed ontology candidate selection and comparison.

In some embodiments, the system 100 can output to ontology alignment component 199 one or more of the ontology pairings 195 based on such evaluations (for example, the one or more ontology pairings with the highest similarity outcome score can be output) and/or generate a mapping Ω (designated by reference numeral 198) between similar concepts in ontology pairings 195 based on similarity outcome 122. In a further embodiment, the ontology alignment component 199 further generates a new or modified ontology, schema, or relationship list (for example, a list of related ontology concepts) based on the alignment mapping. Such a new or modified ontology may serve as one of the ontology candidates 190.

It should be noted that ontology similarity component 120 can evaluate candidate selection rule 112 and/or similarity rule 124 based on a variety of criteria including, but not limited to, observational criteria, structural criteria, functional criteria, usability criteria, and/or processing time oriented criteria. For example, criteria can include, but are not limited to, one or more of the following comparisons:

ontology concept count based on the total number of concepts in an ontology.
  ontology concept instance count based on the number of linked paragraph instances over all concepts.
  ontology relationship type count based on the total number of unique relationships in ontology, such as 'is a part of', 'is equivalent to', etc.
  ontology relation instance count based on the number of relationship links between concepts.
  ontology node depth including maximum depth and/or minimum depth based on the levels of a concept hierarchy within an ontology.
  ontology degree centrality based on the average number of relationships linked to each concept.

Other types of criteria can include, but are not limited to, one or more of the following comparisons:

ontology concept string F-score based on computation of precision and recall.
  ontology string, semantic, and string and semantic F-scores based on computation of precision and recall.

Usability criteria can include, but are not limited to, one or more of the following comparisons:

user recognition of ontology which may be based on survey scores to indicate how similar the ontology structure is with current models.
  user fitness which may be based on survey scores to indicate how easy it is for users to load and navigate among the concepts in an ontology.

Time oriented criteria can include, but are not limited to, one or more of the following comparisons:

time required to generate an ontology.
  time required to combine two or more ontologies.

Figure 2:
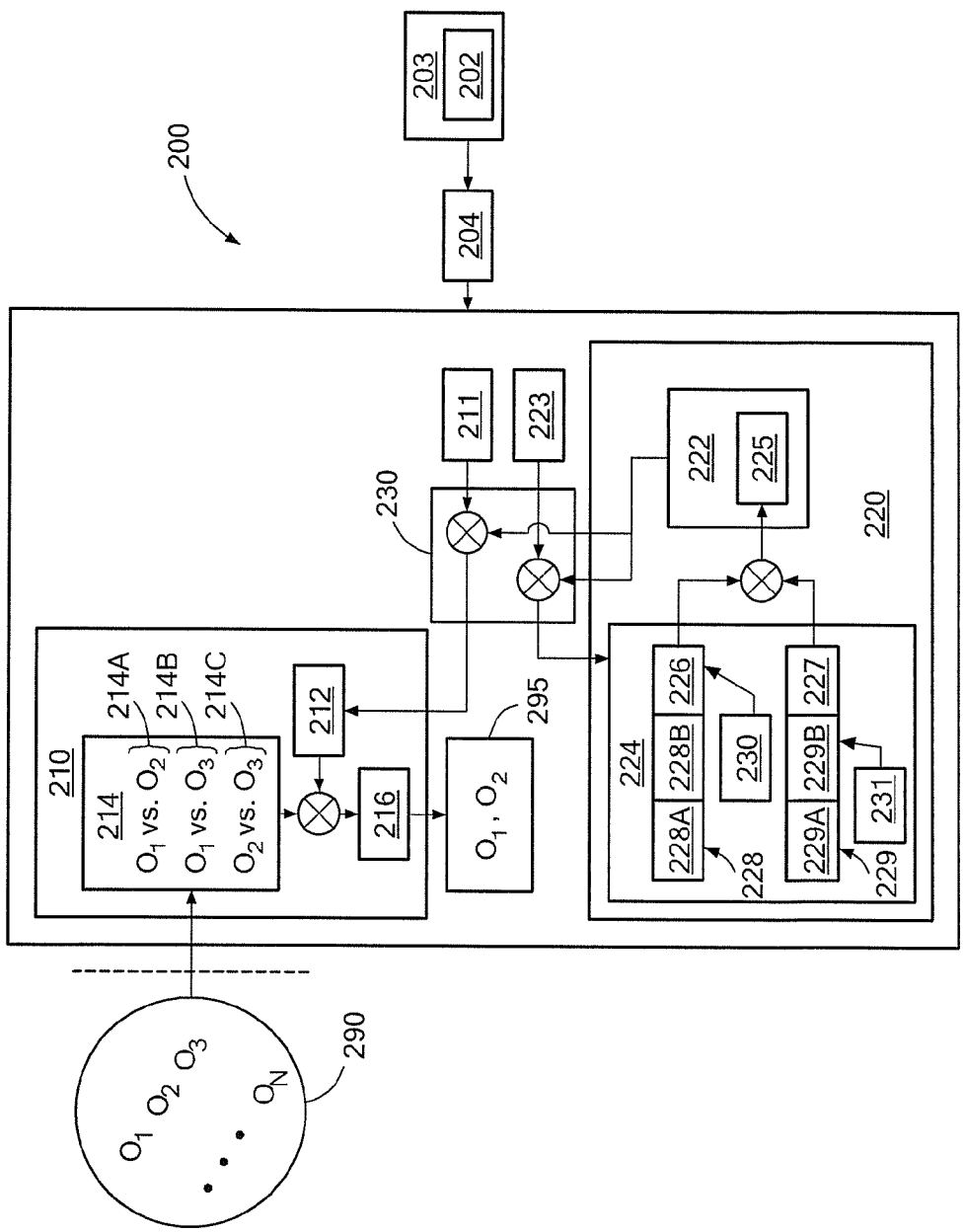
FIG. 2 is a block diagram of another embodiment of a system for ontology candidate selection and comparison.

Referring now to FIG. 2, in another aspect, system 200 for ontology candidate selection and comparison includes microprocessor 204, candidate evaluation agent 210 executing on the microprocessor 204, similarity agent 220, and heuristic agent 230 coupled to candidate evaluation agent 210 and similarity agent 220. In some embodiments, system 200 includes instructions 202 stored in memory 203 that when loaded into and executed by microprocessor 204 enable ontology candidate selection, comparison, and alignment. System 100 may include software and/or hardware components to enable various features of the candidate evaluation agent 210, similarity agent 220, and heuristic agent 230.

Candidate evaluation agent 210 receives ontology data associated with ontology candidates 290, compares combinations 214 of ontology candidates 290 based on candidate selection rule 212, and generates a comparison outcome 216. Candidate evaluation agent 210 also selects pair of ontologies 295 based on comparison outcome 216.

Similarity agent 220 generates similarity outcome 222 based on similarity rule 224 applied to selected pair of ontologies 295. Heuristic agent 230 selects candidate selection rule 212 from plurality of candidate selection rules 211 and selects similarity rule 224 from plurality of similarity rules 223. Heuristic agent 230 also evaluates candidate selection rule 212, similarity rule 224, or both based on similarity outcome 222.

In some embodiments, candidate evaluation agent 210 generates set of ontology combinations 214 including combinations of some or all of ontology candidates 290 (which are designated in FIG. 2 and in the corresponding text as $O_1$, $O_2$, $O_3$, up to $O_N$). Ontology combinations 214 include first ontology candidate (for example, $O_1$) and second ontology candidate (for example, $O_2$) which are compared based on candidate selection rule 212 to generate respective combination comparisons (generally denoted by reference numeral 216). As will be described in more detail below, candidate evaluation agent 210 selects pair of ontologies 295 (that is, one of the combinations 214) based on the comparisons 216.

In one particular embodiment illustrated in FIG. 2, ontology combinations 214 include combinations $O_1$ vs. $O_2$ (214A), $O_1$ vs. $O_3$ (214B) and $O_2$ vs. $O_3$ (214C), which include all possible combinations of ontology candidates $O_1$, $O_2$, and $O_3$. Candidate selection agent 210 compares each ontology combination 214A, 214B, 214C based on candidate selection rule 212 to generate comparisons 216. In a further embodiment, comparisons 216 include values generated from candidate selection rule 212 and which may be sorted for selection purposes.

In a further embodiment, candidate selection rule 212 is associated with ontology observational criteria and/or ontology functional criteria as may be the same or similar to those described in conjunction with candidate selection rule 112. In the same or different embodiment, similarity rule 224 can be based on a variety of ontological criteria as may be the same or similar to those ontology criteria described in conjunction with similarity rule 124.

In some embodiments, similarity rule 224 is based on confidence level 226 (as may be the same or similar to confidence level 126 described in conjunction with FIG. 1) associated with text-based association 228 including first concept string 228A from a first ontology and second concept string 228B from a second ontology (as may be the same or similar to text-based association 128 and concept strings 128A, 128B described in conjunction with FIG. 1 and TABLE 1). Similarity rule 224 can be further based on threshold confidence level 230 (as may be the same or similar to threshold confidence level 130 described in conjunction with FIG. 1).

In the same or a different embodiment, similarity rule 224 is based on confidence level 227 associated with semantic-based association 229 including first concept string 229A from the first ontology and second concept string 229B from the second ontology (as may be the same or similar to semantic-based association 129 and concept strings 129A, 129B described in conjunction with FIG. 1 and TABLE 2). In still a further embodiment, similarity rule 224 is further based on threshold confidence level 231 (as may be the same or similar to threshold confidence level 131 described in conjunction with FIG. 1).

In further embodiments, similarity agent 220 generates similarity outcome 222 based on text-based associations 228 and semantic-based associations 229. Similarity outcome 222 may be based on similarity outcome score 225 (as may be the same or similar to similarity outcome score 125 described in conjunction with FIG. 1 and TABLE 3) of a number of text-based associations 228 greater than or equal to text-based threshold confidence level 230 and a number of semantic-based associations 229 greater than or equal to semantic-based threshold confidence level 231.

In some embodiments, heuristic agent 230 evaluates candidate selection rule 212 and/or similarity rule 224 based on similarity outcome 222. In yet another embodiment, the evaluation is based on a group of sorted similarity outcomes, which may include sorted similarity outcome scores (such as those exemplified in TABLE 3) for ontology pairings 295. Based on an evaluation or feedback of previously produced concept alignment, Heuristic agent 230 can determine which candidate selection rules 212 and/or similarity rules 224 tend to generate the most desirable and effective ontology pairings 295 and select those rules (212, 224) to further feed candidate selection and comparison. It should be noted that heuristic agent 230 can evaluate candidate selection rule 212 and/or similarity rule 224 based on a variety of evaluation criteria such as those described in conjunction with ontology similarity component 120.

Figure 3:
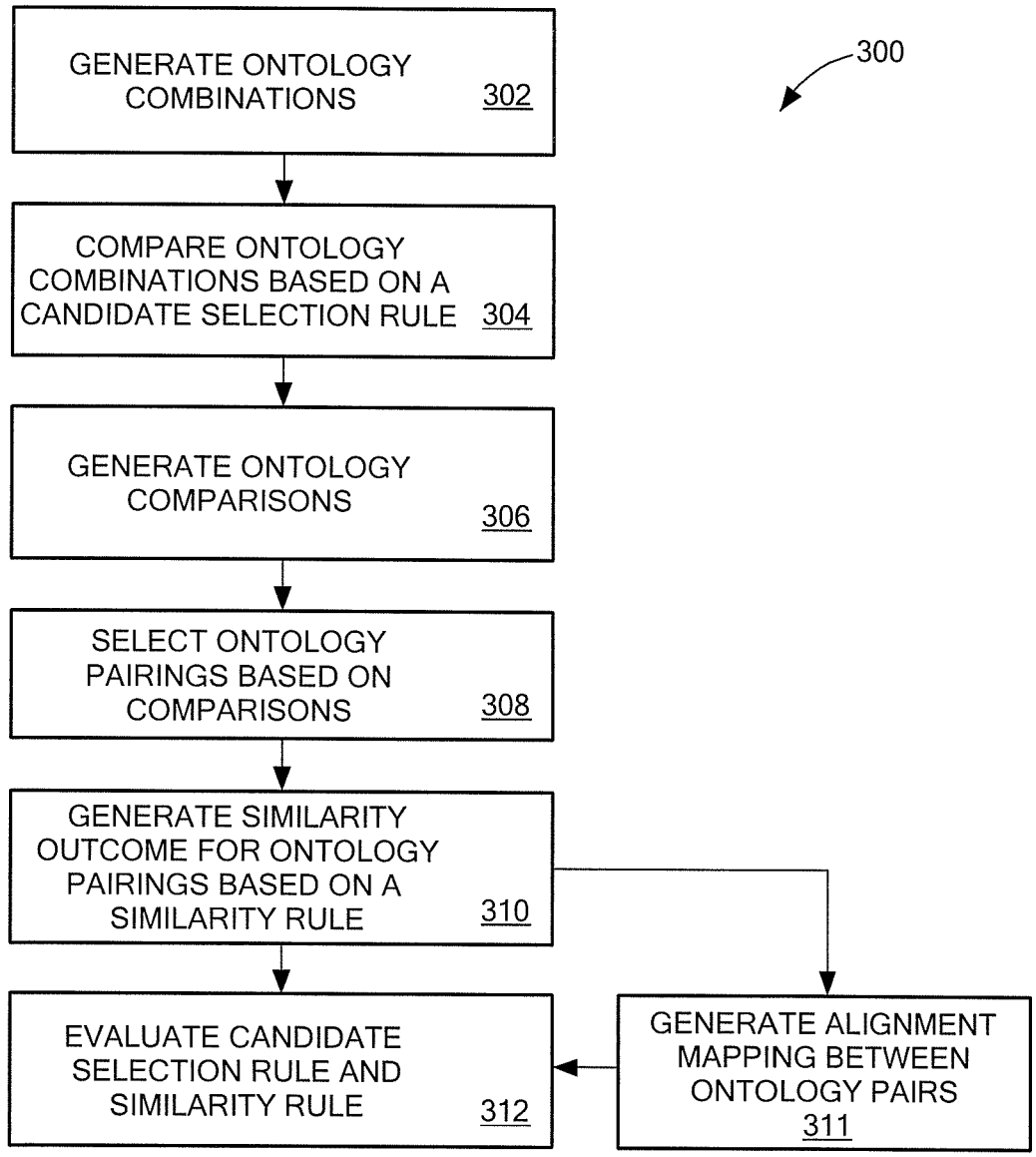
FIG. 3 is a flow diagram of an embodiment of a method for ontology candidate selection and comparison.

Referring now to FIG. 3, in another aspect, method 300 for ontology candidate selection and comparison includes, at 302, generating ontology combinations from a group of ontology candidates, each ontology combination including a first ontology candidate and second ontology candidate, at 304, comparing the first ontology candidate and the second ontology candidate in each ontology combination based on a candidate selection rule to, at 306, generate a plurality of comparisons of the ontology combinations. Method 300 further includes, at 308, based on the comparisons, selecting from the ontology candidates a pair of ontologies and, at 310, generating a similarity outcome related to the pair of ontologies based on a similarity rule. Method 300 may further include, at 311, generating an alignment mapping between similar concepts in ontology pairings based on similarity outcomes and, at 312, evaluating the candidate selection rules and/or the similarity rules based on the similarity outcome.

It should be appreciated that one or more of the method steps (that is, steps 302, 304, 306, 308, 310, 311, 312) may be implemented in a microprocessor and, in particular, may be implemented as computer software instructions loaded from memory into a microprocessor for execution.

Alternatively, one or more of the method steps may be performed by functionally equivalent circuits such as an application specific integrated circuit (ASIC). Method 300 does not depict the syntax of any particular programming language. Rather, method 300 illustrates the information, which one of ordinary skill in the art requires to fabricate circuitry or to generate computer software to perform the processing required to implement at least a portion of the techniques described herein. It will be appreciated by those of ordinary skill in the art that the particular sequence of steps described is illustrative only and can be varied without departing from the spirit of the techniques described herein.

Figure 4:
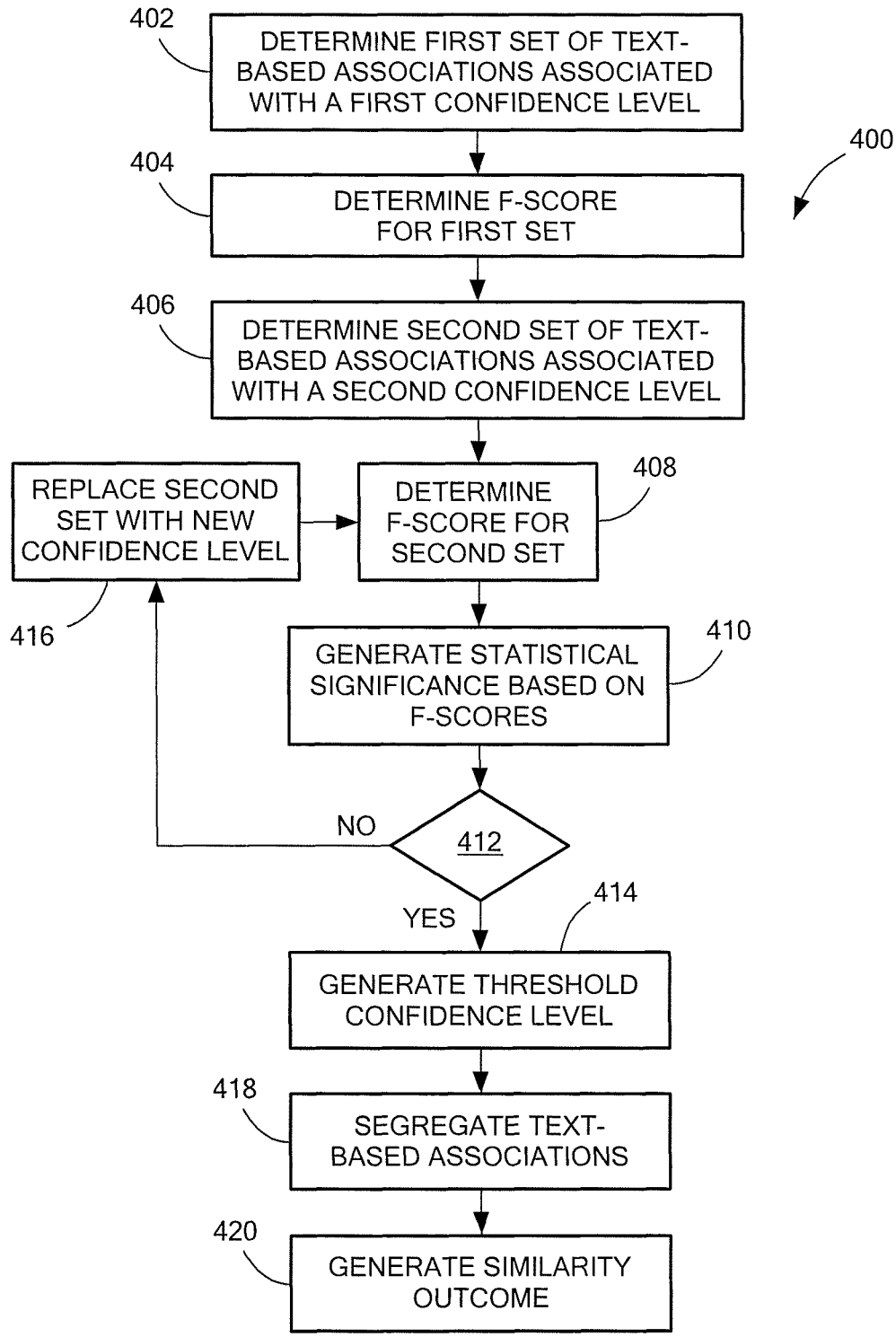
FIG. 4 is a flow diagram of a more detailed embodiment of the method of FIG. 3.

Referring now to FIG. 4, method 400 to generate a threshold confidence level for text-based associations includes, at 402, determining a first set of text-based associations including concept strings from a first ontology and a second ontology and associated with a first confidence level. Method 400 further includes, at 404, determining an F-score based on the first set of text-based associations and, at 406, determining a second set of text-based associations including concept strings from the first ontology and the second ontology and associated with a second confidence level.

Method 400 further includes, at 408, determining an F-score based on the second set of text-based associations and, at 410, generating a statistical significance value based on the F-scores and sample sizes for the first set of text-based associations and the second set of text-based associations. At 412, method 400 includes determining whether the first set of text-based associations and the second set of text-based associations are statistically different and, if so, at 414 generating a threshold confidence level based on the confidence level associated with the second set of text-based associations. If not, at 416, the second set of text-based associations is replaced using another confidence level.

Method 400 further includes, at 418, segregating text-based associations based on the generating threshold confidence level. At 420, the generated similarity outcome is based on text-based associations associated with confidence levels which meet or exceed the threshold confidence level.

Figure 5:
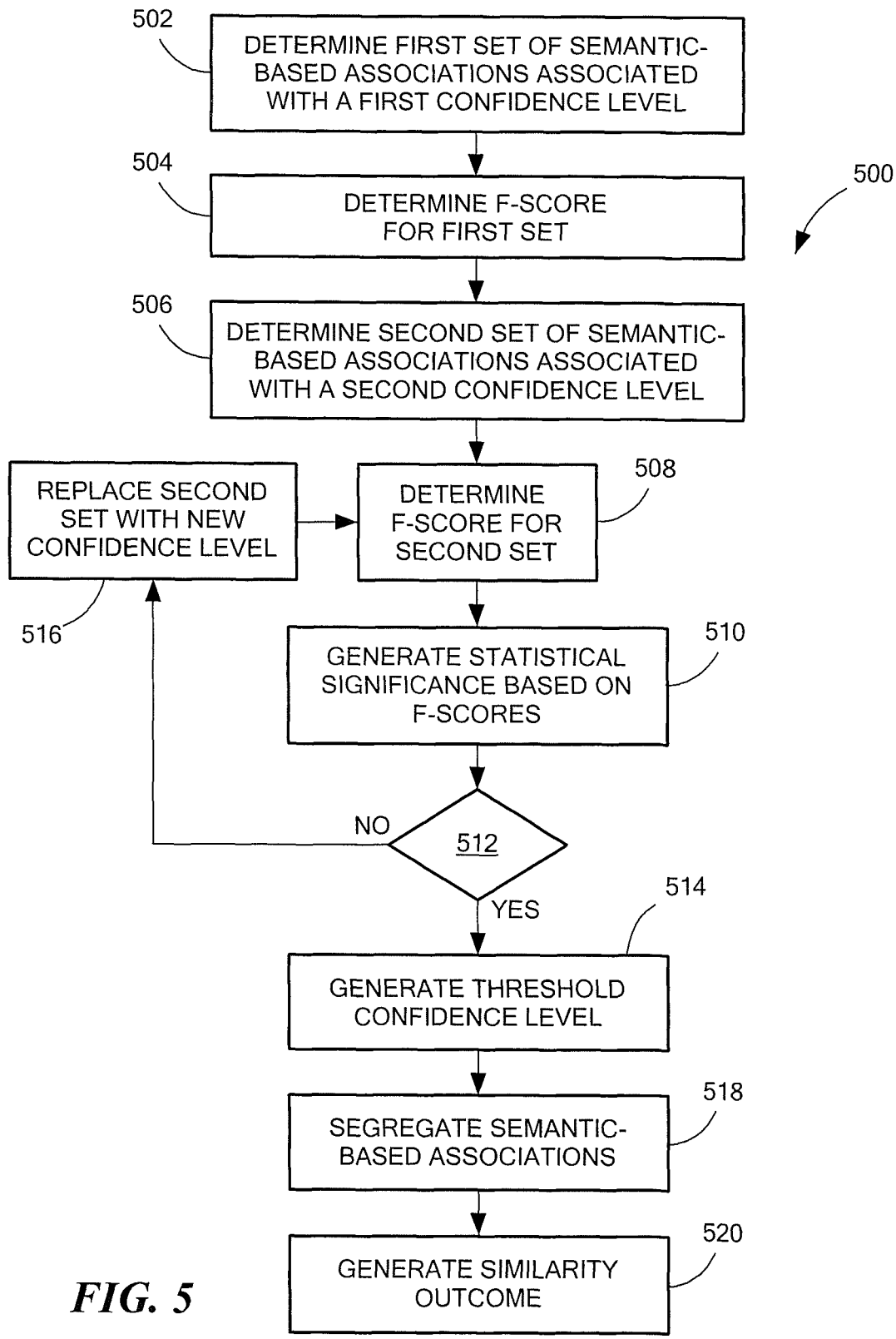
FIG. 5 is a flow diagram of a more detailed embodiment of the method of FIG. 3.

Referring now to FIG. 5, method 500 to generate a threshold confidence level for semantic-based associations includes, at 502, determining a first set of semantic-based associations including concept strings from a first ontology and a second ontology and associated with a first confidence level. Method 500 further includes, at 504, determining an F-score based on the first set of semantic-based associations and, at 506, determining a second set of semantic-based associations including concept strings from the first ontology and the second ontology and associated with a second confidence level.

Method 500 further includes, at 508, determining an F-score based on the second set of semantic-based associations and, at 510, generating a statistical significance value based on the F-scores and sample sizes for the first set of semantic-based associations and the second set of semantic-based associations. At 512, method 500 includes determining whether the first set of semantic-based associations and the second set of semantic-based associations are statistically different and, if so, at 514 generating a threshold confidence level based on the confidence level associated with the second set of semantic-based associations. If not, at 516, the second set of semantic-based associations is replaced using semantic-based associations associated with another confidence level (which may include the next lowest confidence level).

Method 500 further includes, at 518, segregating semantic-based associations based on the generating threshold confidence level. At 520, the generated similarity outcome is based on semantic-based associations associated with confidence levels which meet or exceed the threshold confidence level.

Figure 6:
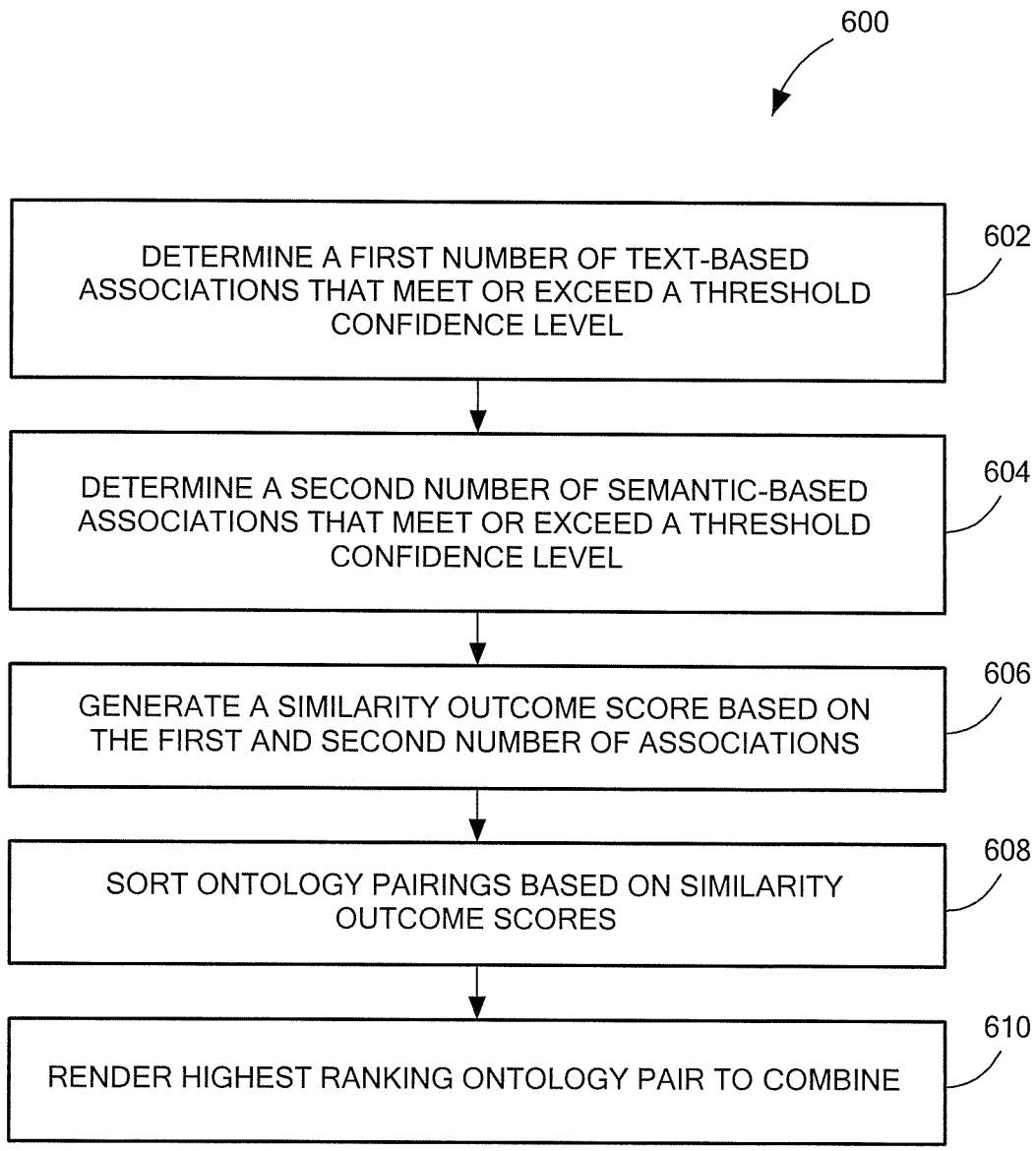
FIG. 6 is a flow diagram of a more detailed embodiment of the method of FIG. 3.

Referring now to FIG. 6, method 600 to generate a similarity outcome based on similarity outcome scores corresponding to text-based associations and semantic-based associations which meet or exceed a threshold confidence level includes, at 602, determining a first number of text-based associations associated with a confidence level that meets or exceeds the threshold confidence level and, at 604 determining a second number of semantic-based associations associated with a confidence level that meets or exceeds the threshold confidence level. At 606, method 600 includes generating a similarity outcome score representing a score of the first and second number and, at 608, sorting ontologies pairs based on their similarity outcome score, which in some embodiments may include sorting the scores in ascending or in descending order. In a further embodiment, method 600 includes, at 610, based on said sorting of ontology pairs, rendering a highest ranking ontology pair, which can be said to represent the most desirable and effective ontology pair for combing (which may include aligning and/or merging) into a single ontology.

Figure 7:
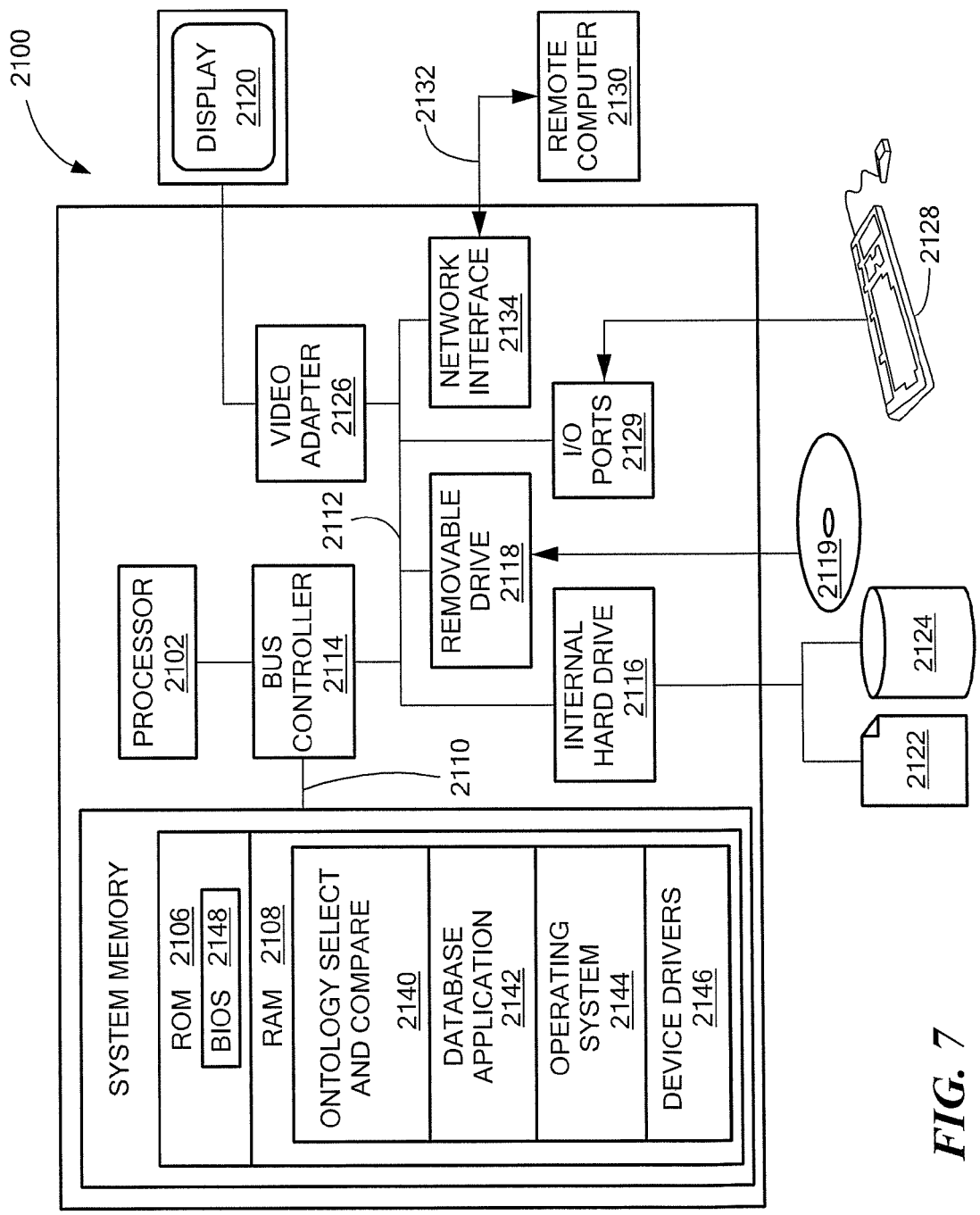
FIG. 7 is a diagram showing an exemplary hardware and operating environment of a suitable computer for use with embodiments of the invention.

FIG. 7 illustrates a computer 2100 suitable for supporting the operation of an embodiment of the inventive systems, concepts, and techniques described herein. The computer 2100 includes a microprocessor 2102, for example, a desktop processor, laptop processor, server and workstation processor, and/or embedded and communications processor. Computer 2100 can represent any server, personal computer, laptop, or even a battery-powered mobile device such as a handheld personal computer, personal digital assistant, or smart phone.

Computer 2100 includes a system memory 2104 which is connected to the processor 2102 by a system data/address bus 2110. System memory 2104 includes a read-only memory (ROM) 2106 and random access memory (RAM) 2108. The ROM 2106 represents any device that is primarily read-only including electrically erasable programmable read-only memory (EEPROM), flash memory, etc. RAM 2108 represents any random access memory such as Synchronous Dynamic Random Access Memory (SDRAM). The Basic Input/Output System (BIOS) 2148 for the computer 2100 is stored in ROM 2106 and loaded into RAM 2108 upon booting.

Within the computer 2100, input/output (I/O) bus 2112 is connected to the data/address bus 2110 via a bus controller 2114. In one embodiment, the I/O bus 2112 is implemented as a Peripheral Component Interconnect (PCI) bus. The bus controller 2114 examines all signals from the processor 2102 to route signals to the appropriate bus. Signals between processor 2102 and the system memory 2104 are passed through the bus controller 2114. However, signals from the processor 2102 intended for devices other than system memory 2104 are routed to the I/O bus 2112.

Various devices are connected to the I/O bus 2112 including internal hard drive 2116 and removable storage drive 2118 such as a CD-ROM drive used to read a compact disk 2119 or a floppy drive used to read a floppy disk. The internal hard drive 2116 is used to store data, such as in files 2122 and database 2124. Database 2124 includes a structured collection of data, such as a relational database. A display 2120, such as a cathode ray tube (CRT), liquid-crystal display (LCD), etc. is connected to the I/O bus 2112 via a video adapter 2126.

A user enters commands and information into the computer 2100 by using input devices 2128, such as a keyboard and a mouse, which are connected to I/O bus 2112 via I/O ports 2129. Other types of pointing devices that may be used include track balls, joy sticks, and tracking devices suitable for positioning a cursor on a display screen of the display 2120.

Computer 2100 may include a network interface 2134 to connect to a remote computer 2130, an intranet, or the Internet via network 2132. The network 2132 may be a local area network or any other suitable communications network.

Computer-readable modules and applications 2140 and other data are typically stored on memory storage devices, which may include the internal hard drive 2116 or the compact disk 2119, and are copied to the RAM 2108 from the memory storage devices. In one embodiment, computer-readable modules and applications 2140 are stored in ROM 2106 and copied to RAM 2108 for execution, or are directly executed from ROM 2106. In still another embodiment, the computer-readable modules and applications 2140 are stored on external storage devices, for example, a hard drive of an external server computer, and delivered electronically from the external storage devices via network 2132.

The computer-readable modules 2140 may include compiled instructions for implementing embodiments directed to ontology candidate selection and comparison described herein. In a further embodiment, the computer 2100 may execute ontology candidate selection and comparison on one or more processors. For example, a first processor for generating and selecting ontology candidates (as may be the same or similar to ontology candidate selection component 110 described in conjunction with FIG. 1) and a second processor for generating ontology similarity outcomes and evaluating candidate selection and similarity rules (as may be the same or similar to ontology similarity component 120, candidate selection rule 112, and similarity rule 124 described conjunction with FIG. 1). Furthermore, the first and second processors may be respective processors of a dual-core processor. Alternatively, the first and second processor may respective first and second computing devices.

The computer 2100 may execute a database application 2142 to model, organize, and query data stored in database 2124 (e.g., data associated with ontology candidates). The data may be used by the computer-readable modules and applications 2140 and information associated with the data may be rendered over the network 2132 to a remote computer 2130 and other systems.

In general, the operating system 2144 executes computer-readable modules and applications 2140 and carries out instructions issued by the user. For example, when the user wants to execute a computer-readable module 2140, the operating system 2144 interprets the instruction and causes the processor 2102 to load the computer-readable module 2140 into RAM 2108 from memory storage devices. Once the computer-readable module 2140 is loaded into RAM 2108, the processor 2102 can use the computer-readable module 2140 to carry out various instructions. The processor 2102 may also load portions of computer-readable modules and applications 2140 into RAM 2108 as needed. The operating system 2144 uses device drivers 2146 to interface with various devices, including memory storage devices, such as hard drive 2116 and removable storage drive 2118, network interface 2134, I/O ports 2129, video adapter 2126, and printers.

Having described preferred embodiments of the invention it will now become apparent to those of ordinary skill in the art that other embodiments incorporating these concepts may be used. Accordingly, it is submitted that the invention should not be limited to the described embodiments but rather should be limited only by the spirit and scope of the appended claims.

What is claimed is:

1. A system for ontology candidate selection and comparison comprising:
   a microprocessor;
   an ontology candidate selection component executing on the microprocessor and configured to:
      compare at least a portion of a plurality of ontology candidates based upon a candidate selection rule; and
      based upon said comparison, select a pair of ontologies from the plurality of ontology candidates; and
   an ontology similarity component coupled to the ontology candidate selection component and configured to:
      generate a similarity outcome related to the pair of ontologies based upon a similarity rule; and
      evaluate at least one of: the candidate selection rule or the similarity rule based upon the similarity outcome;
   wherein the pair of ontologies includes a first ontology and a second ontology and the similarity rule is based upon:

a plurality of text-based confidence levels associated with a plurality of text-based associations, each text-based association including concept strings from the first ontology and the second ontology;
a text-based threshold confidence level;
a plurality of semantic confidence levels associated with a plurality of semantic-based associations, each semantic-based association including concept strings from the first ontology and the second ontology; and
a semantic-based threshold confidence level,
and the similarity outcome is based upon:
at least one semantic-based association associated with a semantic-based confidence level greater than or equal to the semantic-based threshold confidence level; and
at least one text-based association associated with a text-based confidence level greater than or equal to the text-based threshold confidence level.

2. The system of claim 1, wherein the ontology candidate selection component is further configured to:
generate a set of ontology combinations from the plurality of ontologies, each ontology combination including a first ontology candidate and second ontology candidate;
compare the first ontology candidate and the second ontology candidate in each ontology combination based on the candidate selection rule;
generate a plurality of sorted comparisons of the ontology combinations; and
select the pair of ontologies according to the sorted comparisons.

3. The system of claim 1, wherein the candidate selection rule is associated with at least one of: ontology observational criteria, ontology structural criteria, ontology functional criteria, ontology processing time criteria, or ontology usability criteria.

4. The system of claim 3, wherein the ontology candidate selection component is further configured to:
select the pair of ontologies based on a comparison of at least one of: an ontology observational criterion of the first ontology and an ontology observational criterion of the second ontology or an ontology functional criterion of the first ontology and an ontology functional criterion of the second ontology.

5. The system of claim 1, wherein the pair of ontologies includes a first ontology and a second ontology and the similarity rule is based on a confidence level associated with a text-based association including a first concept string from the first ontology and a second concept string from the second ontology.

6. The system of claim 5, wherein the similarity rule is further based on a threshold confidence level and the similarity outcome is based on at least one text-based association associated with a confidence level greater than or equal to the threshold confidence level.

7. The system of claim 6, wherein the ontology similarity component is further configured to:
generate the threshold confidence level based on an F-score associated with the at least one text-based association.

8. The system of claim 1, wherein the pair of ontologies includes a first ontology and a second ontology and the similarity rule is based on a confidence level associated with a semantic-based association including a first concept from the first ontology and a second concept string from the second ontology.

9. The system of claim 8, wherein the similarity rule is further based on a threshold confidence level and the similarity outcome includes at least one semantic-based association associated with a confidence level greater than or equal to the threshold confidence level.

10. The system of claim 9, wherein the ontology similarity component is further configured to:
generate the threshold confidence level based on an F-score and a significant difference calculation associated with the at least one semantic-based association.

11. The system of claim 1, wherein the similarity outcome is further based on a similarity outcome score of a number of text-based associations greater than or equal to the text-based threshold confidence level and a number of semantic-based associations greater than or equal to the semantic-based threshold confidence level.

12. The system of claim 11, wherein the ontology similarity component is further configured to:
evaluate at least one of: the candidate selection rule or the similarity rule, said evaluation based on a plurality of sorted similarity outcome scores associated with a plurality of pairings of ontologies.

13. The system of claim 1, wherein the ontology similarity component is further configured to:
evaluate at least one of: the candidate selection rule or the similarity rule, said evaluation based on a plurality of sorted similarity outcomes associated with a plurality of pairings of ontologies.

14. The system of claim 1, further comprising:
an ontology alignment component coupled to the ontology similarity component and configured to:
generate an alignment mapping between similar concepts in the pair of ontologies based on the similarity outcome.

15. The system of claim 14, wherein the ontology alignment component further generates a new or modified ontology, schema, or relationship list based on the alignment mapping.

16. A system for ontology candidate selection and comparison comprising:
a microprocessor;
a candidate evaluation agent executing on the microprocessor and configured to:
receive ontology data associated with a plurality of ontology candidates;
compare at least one combination of the ontology candidates based on a candidate selection rule to generate a comparison outcome; and
select a pair of ontologies based on the comparison outcome;
a similarity agent configured to:
generate a similarity outcome based on a similarity rule applied to the selected pair of ontologies; and
a heuristic agent coupled to the candidate evaluation agent and the similarity agent and configured to:
select the candidate selection rule from a plurality of candidate selection rules;
select the similarity rule from a plurality of ontology similarity rules; and
evaluate at least one of: the candidates selection rule or the similarity rule based on the similarity outcome,
wherein the similarity rule is further based on a text-based threshold confidence level and a semantic-based threshold confidence level and the similarity outcome is based on:
at least one semantic-based association associated with a semantic-based confidence level greater than or equal to the semantic-based threshold confidence level; and at least one text-based association associated with a text-based confidence level greater than or equal to the text-based threshold confidence level.

17. The system of claim 16, wherein the similarity outcome is further based on a similarity outcome score of a number of text-based associations greater than or equal to the text-based threshold confidence level and a number of semantic-based associations greater than or equal to the semantic-based threshold confidence level.

18. The system of claim 17, wherein the heuristic agent is further configured to:
evaluate at least one of: the candidate selection rule or the similarity rule, said evaluation based on a plurality of sorted similarity outcome scores associated with a plurality of pairings of ontologies; and
select at least one of: the candidate selection rule from a plurality of candidate selection rules or the similarity rule from a plurality of similarity rules based on said evaluation.

19. A method for ontology candidate selection and comparison comprising:
in a microprocessor, generating a set of ontology combinations from a plurality of ontologies, each ontology combination including a first ontology candidate and second ontology candidate;
comparing the first ontology candidate and the second ontology candidate in each ontology combination based upon a candidate selection rule to generate a plurality of comparisons of the ontology combinations;
based upon said comparisons, selecting a pair of ontologies from the plurality of ontology candidates;
generating a similarity outcome related to the pair of ontologies based upon a similarity rule; and
evaluating at least one of: the candidate selection rule or the similarity rule based upon the similarity outcome, wherein the pair of ontologies includes a first ontology and a second ontology and the similarity rule is based upon:
a plurality of text-based confidence levels associated with a plurality of a text-based associations, each text-based association including concept strings from the first ontology and the second ontology;
a text-based threshold confidence level;
a plurality of semantic confidence levels associated with a plurality of semantic-based associations, each semantic-based association including concept strings from the first ontology and the second ontology; and
a semantic-based threshold confidence level, and the similarity outcome is based upon:
at least one semantic-based association associated with a semantic-based confidence level greater than or equal to the semantic-based threshold confidence level; and
at least one text-based association associated with a text-based confidence level greater than or equal to the text-based threshold confidence level.

20. The method of claim 19, wherein said selecting from the plurality of ontology candidates a pair of ontologies further comprises:
sorting the plurality of comparisons; and
selecting the pair of ontologies according to the sorted comparisons.

21. The method of claim 19, wherein the candidate selection rule is associated with at least one of: ontology observational criteria, ontology structural criteria, ontology functional criteria, ontology processing time criteria, or ontology usability criteria.

22. The method of claim 21, wherein said selecting from the plurality of ontology candidates a pair of ontologies further comprises:
selecting the pair of ontologies based on a comparison of at least one of: an ontology structural criterion of the first ontology and an ontology structural criterion of the second ontology or an ontology functional criterion of the first ontology and an ontology functional criterion of the second ontology.

23. The method of claim 19, wherein the pair of ontologies includes a first ontology and a second ontology and the similarity rule is based on a confidence level associated with a text-based association including a concept string from the first ontology and a concept string from the second ontology.

24. The method of claim 23, wherein the similarity rule is further based on a threshold confidence level and the similarity outcome is based on at least one text-based association associated with a confidence level greater than or equal to the threshold confidence level.

25. The method of claim 24, wherein said generating a similarity outcome related to the pair of ontologies further comprises:
generating the threshold confidence level based on an F-score associated with the at least one text-based association.

26. The method of claim 19, wherein the pair of ontologies includes a first ontology and a second ontology and the similarity rule is based on a confidence level associated with a semantic-based association including a concept from the first ontology and a concept from the second ontology.

27. The method of claim 26, wherein the similarity rule is further based on a threshold confidence level and the similarity outcome includes at least one semantic-based association associated with a confidence level greater than or equal to the threshold confidence level.

28. The method of claim 27, wherein said generating a similarity outcome related to the pair of ontologies further comprises:
generating the threshold confidence level based on an F-score and a significant difference calculation associated with the at least one semantic-based association.

29. The method of claim 19, wherein the similarity outcome is further based on a similarity outcome score of a number of text-based associations greater than or equal to the text-based threshold confidence level and a number of semantic-based associations greater than or equal to the semantic-based threshold confidence level.

30. The method of claim 29, wherein said evaluating at least one of: the candidate selection rule or the similarity rule is further based on a plurality of sorted similarity outcome scores associated with a plurality of ontology pairings.

31. The method of claim 19, wherein said evaluating at least one of: the candidate selection rule or the similarity rule is further based on a plurality of sorted similarity outcomes associated with a plurality of ontology pairings.

32. The method of claim 19, further comprising:
generating an alignment mapping between similar concepts in the pair of ontologies based on the similarity outcome.

33. The method of claim 32, wherein said generating an alignment mapping further comprises:
generating a new or modified ontology, schema, or relationship list based on the alignment mapping.

* * * * *